US009007237B2

(12) United States Patent
Jafrancesco et al.

(10) Patent No.: US 9,007,237 B2
(45) Date of Patent: Apr. 14, 2015

(54) LIGHTING DEVICES COMPRISING AN ARRAY OF OPTOELECTRONIC SOURCES

(71) Applicant: Consiglio Nazionale Delle Ricerche, Rome (IT)

(72) Inventors: David Jafrancesco, Rome (IT); Luca Mercatelli, Rome (IT); Paola Sansoni, Rome (IT); Daniela Fontani, Rome (IT); Elisa Sani, Rome (IT); Franco Francini, Rome (IT)

(73) Assignee: Consiglio Nazionale Delle Ricerche, Rome (IT)

( * ) Notice: Subject to any disclaimer, the term of this patent is extended or adjusted under 35 U.S.C. 154(b) by 105 days.

(21) Appl. No.: 13/906,426

(22) Filed: May 31, 2013

(65) Prior Publication Data

US 2014/0002281 A1 Jan. 2, 2014

(51) Int. Cl.

| | |
|---|---|
| ***G08G 3/00*** | (2006.01) |
| ***B60Q 1/00*** | (2006.01) |
| ***F21V 1/00*** | (2006.01) |
| ***F21V 7/00*** | (2006.01) |
| ***F21S 8/10*** | (2006.01) |
| ***F21V 7/04*** | (2006.01) |
| ***H05B 33/08*** | (2006.01) |
| ***B63B 51/02*** | (2006.01) |
| *F21K 99/00* | (2010.01) |
| *F21V 7/06* | (2006.01) |
| *F21V 7/07* | (2006.01) |
| *F21V 7/08* | (2006.01) |

(Continued)

(52) U.S. Cl.

CPC ... *F21V 7/00* (2013.01); *F21K 9/00* (2013.01); *F21S 48/23* (2013.01); *F21V 7/0033* (2013.01); *F21V 7/041* (2013.01); *H05B 33/0803* (2013.01); *B63B 51/02* (2013.01); *F21V 7/045* (2013.01); *G08G 3/00* (2013.01); *F21S 48/215* (2013.01); *F21V 7/06* (2013.01); *F21V 7/07* (2013.01); *F21V 7/08* (2013.01); *F21V 7/22* (2013.01); *F21W 2111/043* (2013.01); *F21W 2131/10* (2013.01); *F21Y 2101/02* (2013.01); *F21Y 2101/025* (2013.01); *F21Y 2105/003* (2013.01)

(58) Field of Classification Search

USPC ........ 340/985, 945, 815.45; 362/296.01, 558, 362/235, 227, 309, 300, 247, 470, 520, 510, 362/245, 477, 2, 97

See application file for complete search history.

(56) References Cited

U.S. PATENT DOCUMENTS 5,782,553 A * 7/1998 McDermott .................. 362/245
5,844,638 A * 12/1998 Ooi et al. ........................ 349/10

(Continued)

FOREIGN PATENT DOCUMENTS

WO WO 2005078338 A1 8/2005

*Primary Examiner* — Hoi Lau

(74) *Attorney, Agent, or Firm* — Robert E. Alderson, Jr.

(57) ABSTRACT

Lighting devices are provided including those which have an array of spatially distributed optoelectronic sources, each source being adapted to emit a respective incident optical beam; a first reflector having an optical axis, and having a first reflective surface that is concave and facing the array of sources to intercept said incident optical beams and to produce corresponding reflected optical beams; a second reflector having a second reflective surface interposed along said optical axis between said array of optoelectronic sources and the first reflector adapted to intercept and deflect said reflected optical beams producing corresponding deflected optical beams, the first reflector being adapted to concentrate the reflected optical beams on the second reflective surface.

15 Claims, 3 Drawing Sheets

(51) Int. Cl.

| | |
|---|---|
| *F21V 7/22* | (2006.01) |
| *F21W 111/043* | (2006.01) |
| *F21W 131/10* | (2006.01) |
| *F21Y 101/02* | (2006.01) |
| *F21Y 105/00* | (2006.01) |

(56) References Cited

U.S. PATENT DOCUMENTS

| | | | | |
|---|---|---|---|---|
| 5,911,489 | A * | 6/1999 | Watanabe | 353/98 |
| 5,988,836 | A * | 11/1999 | Swarens | 362/364 |
| 6,361,190 | B1 * | 3/2002 | McDermott | 362/310 |
| 6,573,659 | B2 * | 6/2003 | Toma et al. | 315/149 |
| 6,758,582 | B1 * | 7/2004 | Hsiao et al. | 362/302 |
| 7,330,314 | B1 * | 2/2008 | Cobb et al. | 359/634 |
| 7,845,800 | B2 * | 12/2010 | Fujinawa | 353/20 |
| 8,541,795 | B2 * | 9/2013 | Keller et al. | 257/98 |
| 2002/0024808 | A1 * | 2/2002 | Suehiro et al. | 362/245 |
| 2002/0149942 | A1 * | 10/2002 | Suehiro | 362/298 |
| 2004/0080938 | A1 * | 4/2004 | Holman et al. | 362/231 |
| 2004/0080945 | A1 * | 4/2004 | Simon | 362/297 |
| 2004/0114366 | A1 * | 6/2004 | Smith et al. | 362/247 |
| 2004/0257546 | A1 | 12/2004 | Banine | |
| 2005/0083699 | A1 * | 4/2005 | Rhoads et al. | 362/296 |
| 2005/0286258 | A1 * | 12/2005 | Katase | 362/497 |
| 2006/0044814 | A1 * | 3/2006 | Ikeda | 362/382 |
| 2006/0077667 | A1 * | 4/2006 | Lui et al. | 362/300 |
| 2006/0250269 | A1 * | 11/2006 | Wang et al. | 340/815.45 |
| 2006/0268555 | A1 * | 11/2006 | Kelly | 362/341 |
| 2007/0013557 | A1 * | 1/2007 | Wang et al. | 340/945 |
| 2008/0144328 | A1 * | 6/2008 | Yagi et al. | 362/516 |
| 2008/0247161 | A1 * | 10/2008 | Hulsey et al. | 362/227 |
| 2009/0121238 | A1 * | 5/2009 | Peck | 257/89 |
| 2009/0296416 | A1 | 12/2009 | Luo et al. | |
| 2010/0020538 | A1 * | 1/2010 | Schulz et al. | 362/235 |
| 2010/0123397 | A1 * | 5/2010 | Tian et al. | 315/113 |
| 2010/0149803 | A1 * | 6/2010 | Nakano et al. | 362/235 |
| 2012/0140498 | A1 * | 6/2012 | Fabbri et al. | 362/470 |
| 2012/0155102 | A1 * | 6/2012 | Melzner et al. | 362/510 |
| 2013/0077303 | A1 * | 3/2013 | Ariyoshi et al. | 362/235 |
| 2013/0114258 | A1 * | 5/2013 | Takatori et al. | 362/247 |
| 2013/0128248 | A1 * | 5/2013 | Komatsuda et al. | 355/67 |
| 2013/0170221 | A1 * | 7/2013 | Isogai et al. | 362/300 |
| 2013/0200407 | A1 * | 8/2013 | Roth | 257/91 |
| 2013/0279164 | A1 * | 10/2013 | Hsu | 362/235 |
| 2013/0286657 | A1 * | 10/2013 | Chen et al. | 362/308 |
| 2014/0002281 | A1 * | 1/2014 | Jafrancesco et al. | 340/985 |
| 2014/0063816 | A1 * | 3/2014 | Seki et al. | 362/309 |
| 2014/0204606 | A1 * | 7/2014 | Smits et al. | 362/558 |
| 2014/0307459 | A1 * | 10/2014 | Brendle et al. | 362/520 |

* cited by examiner

LIGHTING DEVICES COMPRISING AN ARRAY OF OPTOELECTRONIC SOURCES

CROSS REFERENCE TO RELATED APPLICATION

This application claims priority to and benefit of Italian Patent Application No. RM2012A000265 filed Jun. 7, 2012, the contents of which are incorporated by reference in their entirety.

FIELD OF THE INVENTION

The present invention relates to the technical field of lighting devices, and in particular, to lighting devices which include an array of optoelectronic sources.

BACKGROUND OF THE INVENTION

In the technical field of lighting devices, optoelectronic sources such as LED sources to a greater extent, and laser sources to a lesser extent, are becoming more widely used to replace traditional incandescence sources. This involves advantages in terms of energy consumption and maintenance costs. In fact, the optoelectronic sources have lower power consumption than those of incandescence lamps, and they have a service life that is longer than incandescence lamps.

Generally, due to emitted optical power needs, in order to replace an incandescence source, it is necessary to provide an array of optoelectronic sources. Since optoelectronic sources are spatially distributed in the array, in some cases it is not easy or feasible to use optoelectronic sources. Therefore, in such cases, it is necessary use traditional optical incandescence sources. This occurs, for example, but not exclusively, in lighting devices with prevailing lateral emission that are employed as marker lights, lighthouse lamps and lamps for maritime signalling. In such lighting devices, an incandescence lamp that is punctiform, or substantially punctiform, or generally spatially concentrated, is generally provided. Such an incandescence lamp has an omnidirectional radiation diagram. For this reason a collimating lens is generally provided such as a Fresnel lens which is suitable for modifying the radiation diagram so that marker lights have, on the whole, desired directionality characteristics. Traditional incandescence sources, however, have high energy consumption and maintenance costs.

SUMMARY OF THE INVENTION

A general object of the present description is to provide lighting devices with an array of spatially distributed optoelectronic sources that can be used as an alternative to spatially concentrated incandescence sources.

This and other objects are achieved by a lighting device as described and claimed herein and as shown in the accompanying figures which are briefly described immediately below.

DETAILED DESCRIPTION

In the appended Figures, similar or like elements will be designated by the same numeral references.

Figure 1:
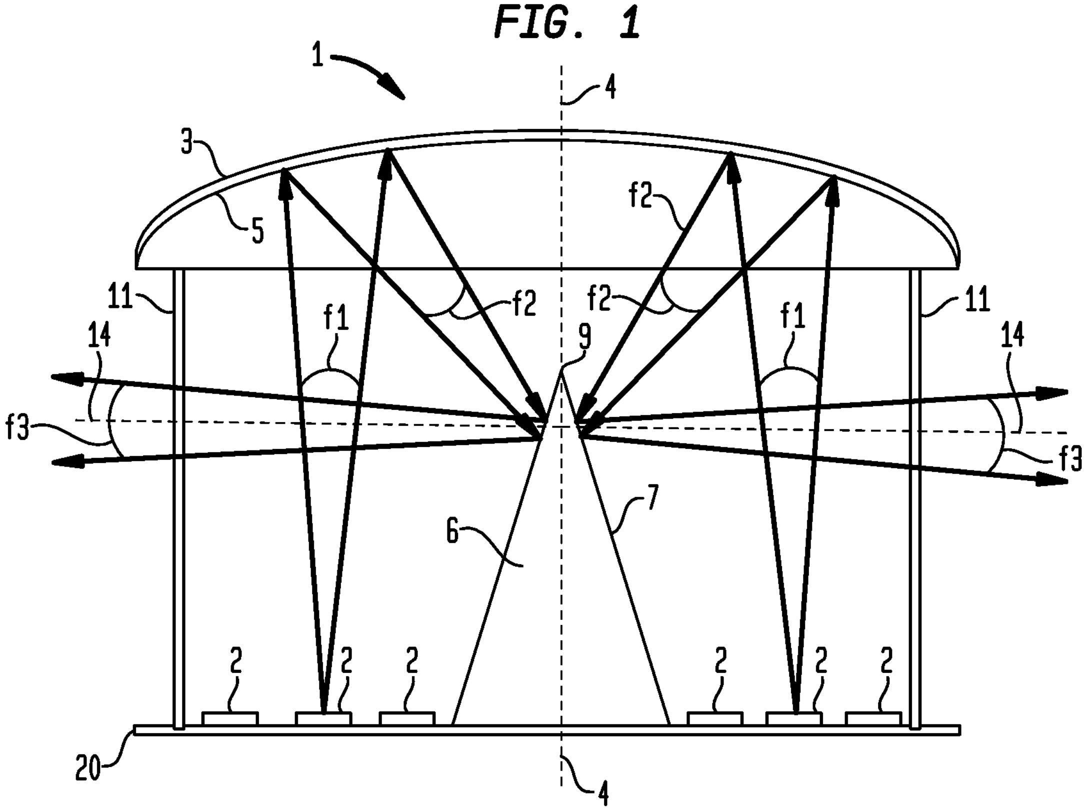
FIG. 1 shows a side sectional view of a first embodiment of a lighting device.

In FIG. 1, a lighting device is shown which includes an array of spatially distributed optoelectronic sources 2. In accordance with a non-limiting embodiment, the lighting device 1 may be part of a maritime signaling marker light, or lighthouse lamp or lamps for maritime signalling. In accordance with an alternative embodiment, the above-mentioned device may be a lighting device for internal environments, for example, domestic environments. In accordance with possible further embodiments, the above-mentioned device may be an external lighting device of a vehicle, such as a camping lamp or a lighting device for public or private external spaces.

In certain embodiments, the optoelectronic sources 2 may be LED sources, i.e., where each of them includes a LED diode. In other alternative embodiments, such sources may be LASER sources, i.e., each of them includes a laser diode.

In certain embodiments, the optoelectronic sources 2 may be secured to a support and supply circuit board 20, for example, a printed board. The above-mentioned sources 2 may be, for example, surface mount devices (SMDs) that are mounted on the circuit board 20. In the above-mentioned embodiment, the sources 2 may lay on the same plane; however, it should be apparent that alternative embodiments may be provided, in which the different sources 2 are arranged, for example, at mutually different heights. A thermal dissipation device may be associated with the circuit board 20, such as a finned plate, not shown in the Figures. Based on the type of power that is used, alternative cooling systems may be provided, such as a forced fluid circulation cooling system.

Each of the optoelectronic sources 2 is suitable for emitting a respective incident optical beam f1. In an ideal situation, such beam f1 may be a perfectly collimated beam. As is known, in situations such as that illustrated in FIG. 1, especially when the optoelectronic sources 2 are LED sources, such beam f1 may be a diverging beam. For example, in the case of LED sources, such beam f1 may diverge according to an opening angle that may reach 120°, or be as small as 10°. In certain embodiments it may range between 5°-8°, if, for example, the LED sources 2 are provided with a collimating lens facing the active surface of the sources 2.

The lighting device 1 may include a first reflector 3 having an optical axis 4 and including a first concave reflective surface 5 facing the array of optoelectronic sources 2. The concave reflective surface 5 is suitable for intercepting the various incident optical beams f1 produced by the optoelectronic sources 2 and for producing corresponding reflected optical beams f2. In certain embodiments, the first reflector 3 may be a spherical reflector, i.e., it has a reflective surface 5 that is a spherical cap. In alternative embodiments, the first reflector 3 may be a parabolic or hyperbolic or elliptical reflector.

In the particular embodiment represented in FIG. 1, the first reflector 3 may be secured to the circuit board 20 using a set of support rods 11, for example, three rods 11, two of which are visible in FIG. 1.

The lighting device 1 may further comprise a second reflector 6 having a second reflective surface 7 interposed along the optical axis 4 between the array of optoelectronic sources 2 and the first reflector 3. The reflective surface of the second reflector 6 may be suitable for intercepting and deflecting the reflected optical beams f2 from the first reflector 3, producing corresponding deflected optical beams f3. The first reflector 3 may be such as to concentrate the reflected optical beams f2 onto the reflective surface 7 of the second reflector 6. In certain embodiments, the first reflector 3 allows focusing most of the reflected optical beams f2 onto a spatially concentrated portion of the reflective surface 7. It should be noticed that in this manner it is advantageously possible to sum, at such spatially concentrated portion, the optical beams emitted by the several sources. Therefore, by virtue of the combination of the two reflectors, it is possible to convert the sources of the array into a punctiform or almost punctiform or substantially spatially concentrated source.

In certain embodiments, the reflective surface 7 may be a conical or frusto-conical surface. As shown in FIG. 1, the reflective surface 7 may be a conical surface, i.e., a surface, or a surface portion, of a cone, having a vertex 9 facing the first reflector 3. In certain embodiments, it is possible to shape and mutually arrange the first reflector 3 and the conical surface 7 so that the reflected optical beams f2 may be directed onto a spatially concentrated region of the conical surface, for example, around the vertex 9 of the cone, or a circular crown proximate to such vertex. For example, in certain embodiments in which the reflector 3 has a focus, it is possible to arrange the vertex 9 at, or at least in the proximity of, such focus. The same applies if the surface 7 is frusto-conical, since, in this case, a portion of such surface proximal at the top of the frustum of the cone can be arranged in the proximity of the above-mentioned focus.

In other embodiments, it is possible to provide a reflective surface 7 that is different from a conical or frusto-conical surface, since the second reflector 6 may have other shapes, for example, dome-shaped or ogive-shaped, or for example, an ellipsoid or a paraboloid shape.

With respect to the first 3 and the second 6 reflectors, these may be made either in glass, or in plastic material, or in metal material coated with reflective and/or antioxidant paints.

Figure 2:
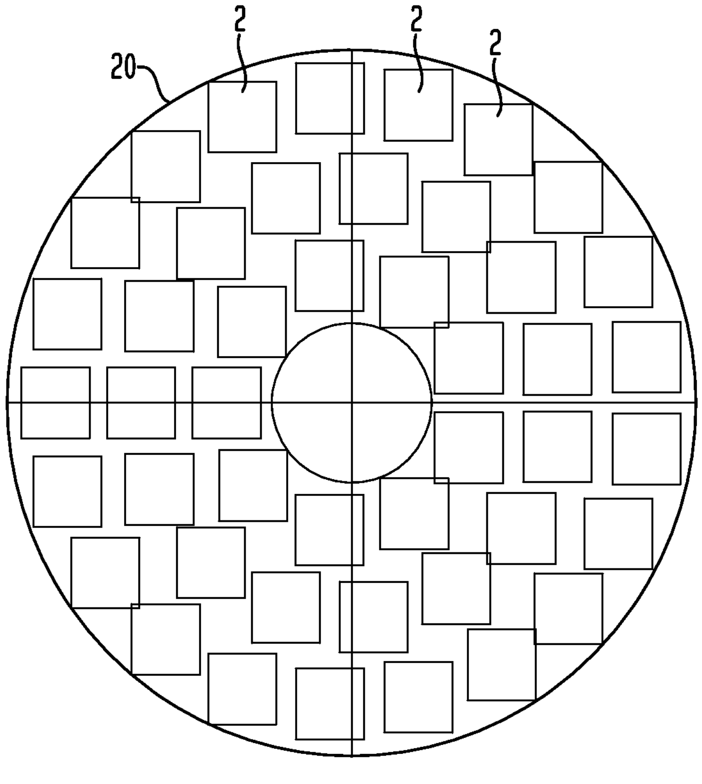
FIG. 2 shows a plane view of a part of the lighting device of FIG. 1.

In FIG. 2, another embodiment of circuit board 20 is shown, on which optoelectronic sources 2 are mounted. In certain embodiments, such as the one shown in FIG. 2, the array of optoelectronic sources 2 may surround the second reflector 6. In such embodiments, the array of optoelectronic sources 2 may be distributed on a circular crown. As shown in FIG. 2, the array of sources 2 may include an array of forty-five LEDs evenly spatially distributed on a circular crown having an outer diameter of about 220 mm. By using 100 Lumen LEDs, a total light flow of 4500 Lumens may be obtained.

It should be noticed that in the embodiments described above, in which the first reflector 3 is spherical, the second reflector 6 is conical or frusto-conical, and the array of sources 2 is distributed on a circular crown, the lighting device 1 has a symmetry with respect to the focal axis 4. However, it is possible to provide for asymmetric embodiments such as, for example, with reference to FIG. 1, embodiments in which the optical device 1 is only composed of one of the portions on the right side or the left side of the optical axis 4.

In certain embodiments, the second reflective surface 7 may produce deflected optical beams f3 that on the whole form an overall output beam having a main emission axis 14 transversal to the focal axis 4 of the first reflector 3. For example, such main emission axis 14 may be perpendicular to the focal axis 4. In this case, the lighting device 1 may be defined as a device having lateral emission.

Figure 3:
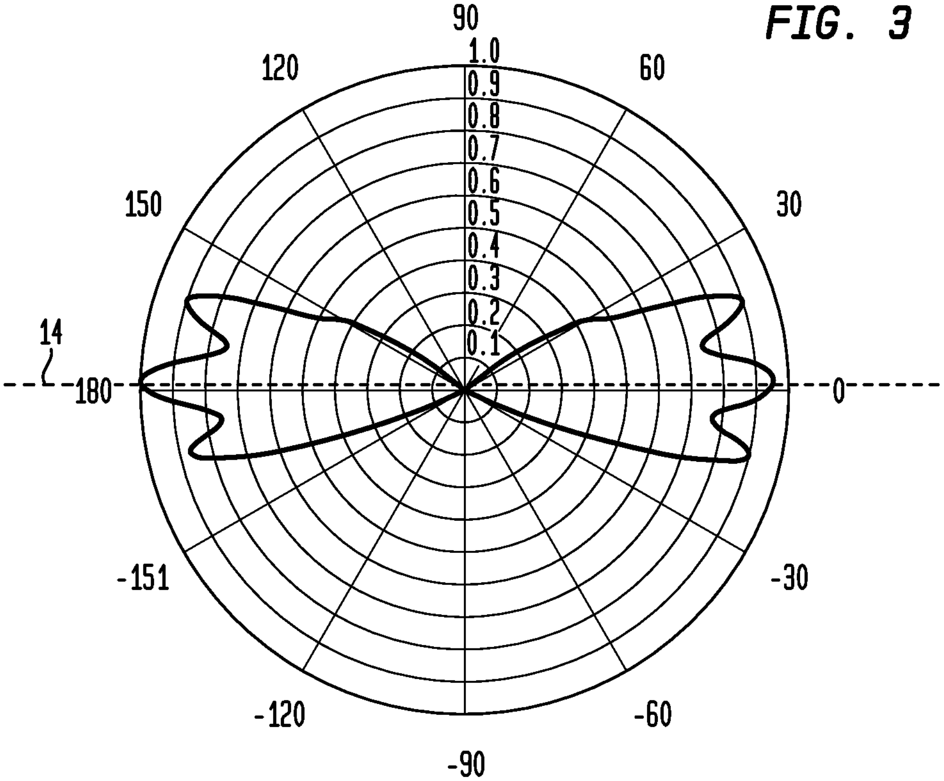
FIG. 3 shows a first section of a radiation diagram of a lighting device of the type represented in FIG. 1.
Figure 4:
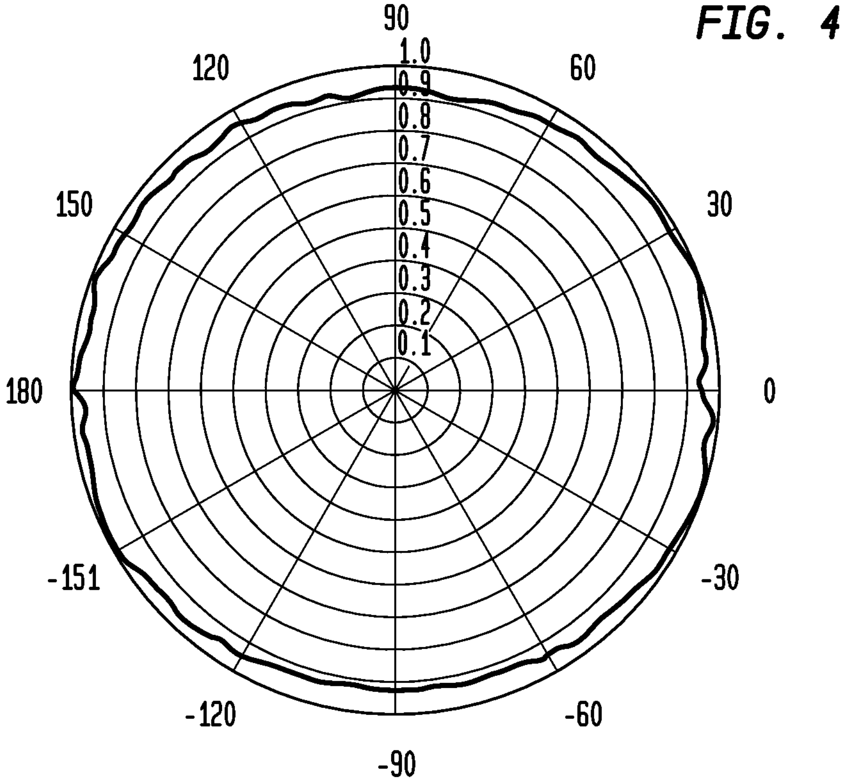
FIG. 4 shows a second embodiment of a radiation diagram of a lighting device of the type represented in FIG. 1.
Figure 5:
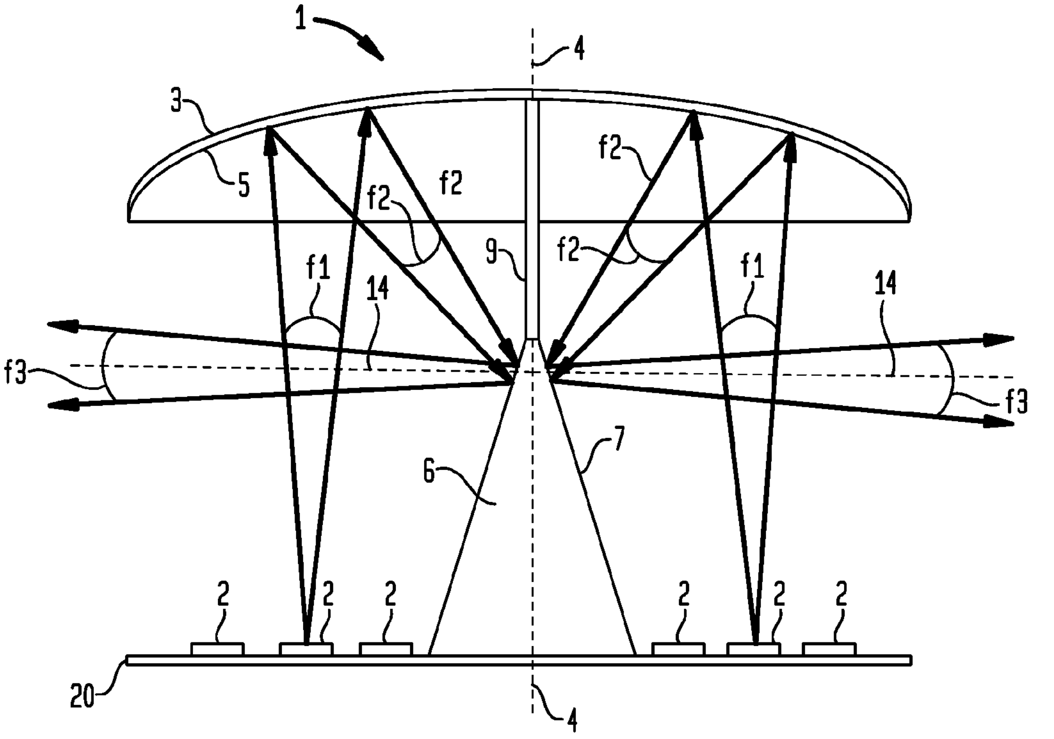
FIG. 5 shows a side sectional view of an alternative embodiment of the lighting device of FIG. 1.

As shown in FIGS. 3 and 4, two sections, a vertical and a horizontal one, respectively, are shown, of the radiation diagram of a lighting device of the type represented in FIG. 1. FIG. 3 shows the overall output beam has a main emission direction 14 perpendicular to the focal axis 4. Such output beam has a divergence angle of about 60°. In contrast FIG. 4 shows that the lighting device 1, being symmetrical with respect to the focal axis 4, has a uniform radiation diagram at 360° on a horizontal plane.

The lighting device 1 may be associated with external collimation and/or reflection and/or protective shield devices. For example, when the lighting device 1 is part of a maritime signalling marker light or lighthouse lighting device, it is possible to provide for a Fresnel lens that is adapted to intercept and collimate the deflected optical beams f3. Furthermore, devices may be provided to move the lighting device 1, for example, by rotating it around a generally vertical axis.

Based on what has been described above, it is clear that lighting devices of the type described above provide a great advance over any previously described device in this field. For example, numerical simulations have been carried out, which show that devices of the type described above may be employed to replace incandescence lamp in a lighthouse lighting device 5, with large energy savings and greatly reduced maintenance costs. In such embodiments, there is the further advantage that, unlike an incandescence lamp, through a lighting device of the type described above, it is possible to laterally direct emitted light, thus avoiding dispersal of the light upwardly, thereby improving the efficiency of a lighthouse.

For example with reference to FIG. 4, it is possible to provide, inter alia, embodiments of the lighting device 1 in which the second reflector 6 is a frusto-conical reflector, and in which a support rod 15 is provided, which, by projecting from the minor base of the second reflector 6, acts as a support for the first reflector 3.

In a further embodiments, the second reflector 6 may be spaced apart from the array of sources 2.

The invention claimed is:

1. A lighting device comprising:

an array of spatially distributed optoelectronic sources, each source being adapted to emit a respective incident optical beam;

a first reflector having an optical axis and having a first concave reflective surface and facing the array of sources to intercept said incident optical beams and produce corresponding reflected optical beams;

a second reflector having a second reflective surface interposed along said optical axis between the array of optoelectronic sources and the first reflector, and adapted to intercept and deflect the reflected optical beams producing corresponding deflected optical beams, the first reflector being such as to concentrate the reflected optical beams onto the second reflective surface.

2. The lighting device of claim 1, wherein the first reflector allows focusing most of the reflected optical beams onto a spatially concentrated portion of the second reflective surface.

3. The lighting device of claim 1, wherein the second reflective surface is a conical or frusto-conical surface.

4. The lighting device of claim 3, wherein the reflective surface is a surface, or a surface portion, of a cone, having a vertex facing the first reflector, or of a frustum of a cone, having a minor base facing the first reflector.

5. The lighting device of claim 2, wherein said spatially concentrated portion is arranged in the proximity of said vertex or of a minor base.

6. The lighting device of claim 4, wherein the first reflector has a focus, and wherein said vertex or said minor base are arranged at or in the proximity of said focus.

7. The lighting device of claim 1, wherein the array of optoelectronic sources surrounds the second reflector.

8. The lighting device of claim 7, wherein the array of optoelectronic sources is distributed on a circular crown.

9. The lighting device of claim 1, wherein the second reflective surface is capable of producing deflected optical beams, which, on the whole, form an output beam having a main emission axis that is substantially transverse to said optical axis.

10. The lighting device of claim 9, wherein the main emission axis is substantially perpendicular to said optical axis.

11. The lighting device of claim 1, wherein the optoelectronic sources comprise LED sources.

12. The lighting device of claim 1, wherein the first reflector comprises a spherical mirror.

13. A lighthouse lighting device comprising a lighting device according to claim 1.

14. The lighthouse lighting device of claim 13, further comprising a Fresnel lens, adapted for intercepting and collimating said deflected optical beams.

15. A maritime signalling lamp comprising the lighting device of claim 1.

* * * * *